United States Patent [19]
Osborne

[11] Patent Number: 6,006,601
[45] Date of Patent: Dec. 28, 1999

[54] METHOD FOR DETERMINING THE PRECISE INITIAL VOLUME OF A MOLD CAVITY OF AN INJECTION MOLDING MACHINE

[75] Inventor: Richard Osborne, Des Moines, Iowa

[73] Assignee: Siebolt Hettinga, Des Moines, Iowa

[21] Appl. No.: 08/968,932

[22] Filed: Nov. 12, 1997

[51] Int. Cl.$^6$ .................................................... G01F 17/00
[52] U.S. Cl. ............................................. 73/149; 425/125
[58] Field of Search .............................. 73/149; 425/145, 425/147; 364/475.05, 564

[56] References Cited

U.S. PATENT DOCUMENTS

| 4,715,221 | 12/1987 | Grims et al. | 73/149 |
| 4,956,996 | 9/1990 | Morris | 73/149 |

FOREIGN PATENT DOCUMENTS

| 2082778 | 3/1982 | United Kingdom | 73/149 |

Primary Examiner—Robert Raevis
Attorney, Agent, or Firm—Brian J. Laurenzo; Michael C. Gilchrist

[57] ABSTRACT

A process for determining the precise initial volume of the mold cavity of an injection molding machine in which a first and second section engage into seated alignment thereby forming a mold cavity. Vent valves, controlling communication between the interior and exterior of the mold cavity, are closed thereby sealing the mold cavity. An injection means begins injecting a test substance into the mold cavity. The test substance continues filling the mold cavity until the detection of a predetermined threshold level. A measuring means performs the step of measuring the amount of the test substance in the mold cavity, thereby providing sufficient information for calculating the precise initial volume of the mold cavity of the injection molding machine. The apparatus used to perform the method described herein comprises an injection molding machine with a mold cavity configured with vent valves capable of sealing the interior of the mold cavity from the exterior. A processing unit operatively connects to the injection molding machine, and a computer-readable control program code executing on the processing unit works the methods described herein to which the present invention relates.

44 Claims, 5 Drawing Sheets

METHOD FOR DETERMINING THE PRECISE INITIAL VOLUME OF A MOLD CAVITY OF AN INJECTION MOLDING MACHINE

BACKGROUND OF THE INVENTION

This invention relates generally to determining the precise initial volume of a mold cavity of an injection molding machine. More specifically, the invention provides a method for filling the mold cavity with a test substance of a known density and compressibility, monitoring the amount of the test substance which enters the mold cavity, and finally calculating the precise initial volume of the mold cavity. Additionally, the invention includes a molding machine with the structural capability of performing the above-mentioned method, and includes automated operation of the molding machine performing the method through the use of a computer program executing on a computer processing unit.

Typically, an injection molding machine consists of an injection assembly and a mold frame. The injection assembly serves to inject a plasticized material into the mold cavity portion of the mold frame. The injection process exerts significant pressure on the mold cavity, with the injection pressure generally increasing over time. Thus, near the end of the injection cycle, when the mold cavity is nearly full, the injection pressure typically reaches its maximum. At this point, the injection pressure tends to force apart the two sections which form the mold cavity which, of course, is undesirable. To prevent this from happening, a piston assembly is included which exerts an opposite force on the mold cavity thereby maintaining the integrity of the mold cavity.

High pressure molding machines utilize piston assemblies designed so that no amount of force exerted by the injection assembly, tending to force the mold cavity apart, can overcome the force exerted by the piston assembly, tending to hold the mold cavity together. Hence the name "high pressure molding". The enormous force required to accomplish this task adds significantly to the cost, size, and weight of the already massive injection molding machines. The excessive pressure causes high pressure molding machines to experience greater wear and tear, and, correspondingly, greater operation and maintenance costs. Additionally, the force required by the high pressure molding machines materially increases the operational danger of the machines. In the past, the amount of material used to fill the mold cavity of a high pressure molding machine, was simple whatever the injection assembly could inject at maximun pressure. In fact, the high pressure molding process starts with more than enough plastic material to fill the mold cavity and simply packs the mold cavity at maximum injection pressure until full. Packing results in many undesirable effects which are well known in the prior art.

Low pressure molding machines, by contrast, utilize significantly lower piston assembly pressures, thus reducing the cost and size of the machines, and the wear and tear on the machines. However, in order to keep the low pressure injection assemblies from forcing the mold sections of the mold cavity apart, low pressure molders must know the precise amount of plastic needed to fill the mold cavity, and not allow more than that amount to enter the mold cavity. Thus, low pressure injection molders do not pack the mold cavity thereby avoiding the higher pressures associated with packing. The injection pressure of a low pressure molding machine still increases over time, just like high pressure molding machines, however, unlike high pressure molding machines, the injection pressure of low pressure molding machines decreases dramatically at the very end of the injection cycle. Accordingly, low pressure molding is dramatically improved by knowing the precise volume of the mold cavity.

While packing the mold cavity represents one of the problems associated with not knowing the precise volume of the mold cavity, short shots represent another problem. Short shots result when not enough plastic material enters the mold cavity. In the case of complex mold cavities, containing irregularly shaped recessed areas, short shots can result in a failure to completely fill the recessed areas. When de-molding the plastic article from the mold cavity, the partially formed recessed areas may break off in the mold cavity from a lack of structural integrity. The residual plastic left in the mold cavity can cause defects in any subsequently molded parts. Additionally, removing the residual plastic from the mold cavity creates time delays and increases setup costs.

The problems associated with low pressure molding, and the techniques for remedying these problems, like the present method, often appear counterintuitive to high pressure molders. High pressure molders will persist in applying high pressure molding techniques, such as packing the mold cavity, to low pressure machines despite instructions to the contrary. This further complicates matters because many users of low pressure injection molding equipment also use high pressure molding machines.

Conventionally, the most common method of determining the initial amount of plastic material to fill the mold cavity of a low pressure molding machine involves a repetitive guessing process. The first guess always leaves a little room in the mold cavity, to avoid packing. Each successive guess increases the amount of plastic until a satisfactory article is molded. This guessing process wastes time and material, varies greatly based on the experience of the molder and the complexity of the molded article, and runs the aforementioned risks associated with short shots.

Accordingly, an exact, repeatable, and automated method for determining the precise initial amount of material needed to fill the mold cavity proves invaluable to low pressure molding, and enables low pressure molders to substantially eliminate the difficulties discussed hereinabove.

SUMMARY OF THE INVENTION

Accordingly, an object of the present invention comprises a method for allowing a molder to determine the precise initial volume of a mold cavity.

Another object of the present invention comprises providing an automated method for determining the precise initial volume of a mold cavity.

Still another object of the present invention comprises providing a quicker, less costly, and less wasteful method for determining the precise initial volume of a mold cavity.

Another object of the present invention comprises providing a method for determining the precise initial volume of a mold cavity which reduces the risk of packing the mold cavity.

A further object of the present invention comprises providing a method for determining the precise initial volume of a mold cavity which reduces the risk of injecting short shots into the mold cavity.

Another object of the present invention comprises providing an injection molding machine to accomplish the method of determining the precise initial volume of a mold cavity.

Still another object of the present invention comprises providing a processing unit, and a computer-readable control program code executing on the processing unit, which performs the work of determining the precise initial volume of a mold cavity.

These and other object of the invention will become apparent upon reference to the following specification, drawings, and claims.

By the present invention, it is proposed to overcome the difficulties encountered heretofore. To this end, a first and second section of a mold portion of an injection molding machine are engaged into seated alignment thereby forming a mold cavity. The mold cavity of the injection molding machine is sealed by the closing of one or more vent valves. An injection means then injects a test substance into the mold cavity, the test substance filling the mold cavity until the detection of a predetermined threshold level. A measuring means measures the amount of the test substance in the mold cavity, thereby enabling calculation of a precise initial volume of the mold cavity of the injection molding machine. In the preferred embodiment of the invention the test substance comprises air, and the injection means involves pumping the air into an inline injector assembly which injects the air into the mold cavity. In the preferred embodiment of the invention the measuring means includes a thermocoupler for measuring the temperature of the air in the mold cavity, a flow meter for measuring the flow of the air into the mold cavity, and a pressure transducer for measuring the pressure of the air and for detecting the predetermined threshold level of the air in the mold cavity. The apparatus used to perform the method described herein comprises an injection molding machine with a mold cavity configured with vent valves capable of sealing the interior of the mold cavity from the exterior. A processing unit is operatively connected to the injection molding machine, and a computer-readable control program code executing on the processing unit performs the methods described herein to which the present invention relates.

DETAILED DESCRIPTION OF THE INVENTION

Figure 1:
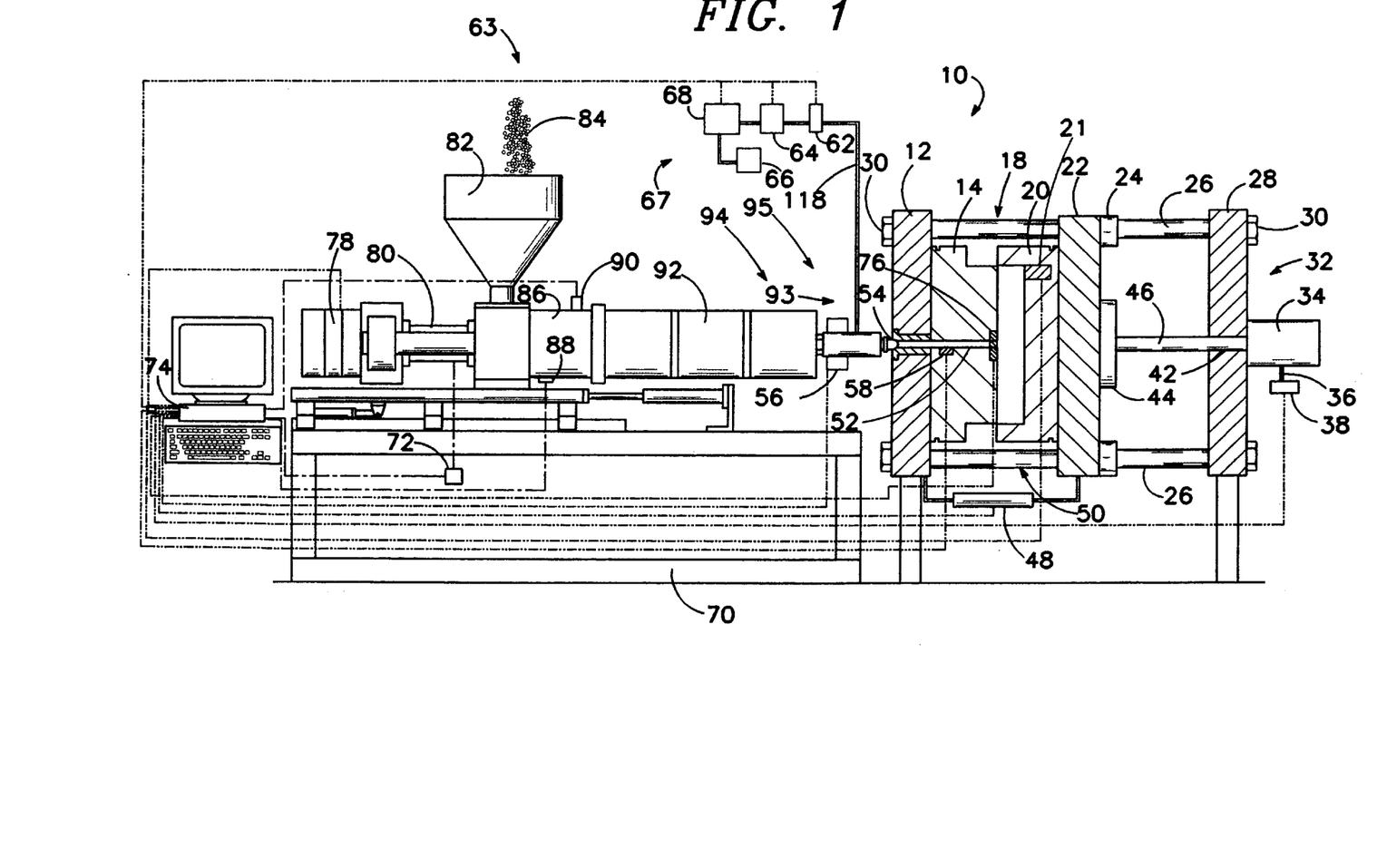
FIG. 1 is a side elevational view of a plastic injection molding machine in accordance with the present invention, showing a mold cavity of an injection molding machine in an open position.

FIG. 1 shows an injection molding machine 10 for molding plastic articles. The injection molding machine consists of an injection assembly 94, which rests upon a main frame 70, and an independent mold frame 50 located in operative proximity to the injection assembly 94.

The mold frame 50 includes cylindrical support bars 26 located in conjunction with a first plate 12 and a second plate 28. The support bars 26 define the outer perimeter of the rectangular shaped mold frame 50. The support bars 26 pass through the first plate 12, second plate 28, and a mold carriage 22. Nuts 30 secure the support bars 26 to the first plate 12, and to the second plate 28. The mold carriage 22 lies between and parallel to the first plate 12, and to the second plate 28. The configuration allows the mold carriage 22 to slide along the longitudinal axis of the support bars 26. Support blocks 24, mounted to the mold carriage 22, provide additional support to the mold carriage 22. A hydraulic piston assembly 32 controls the movement of the mold carriage 22. The hydraulic piston assembly 32 consists of a platen 44 affixed, generally, to the center of the mold carriage 22, a piston ram 46 which, in turn, is connected to the platen 44, and a hydraulic cylinder 34 secured to the piston ram 46. The hydraulic cylinder 34 lies on the opposite side of the second plate 28 from the mold carriage 22. A throughbore 42 in the second plate 28 allows the piston ram 46 to pass through the center of the second plate 28. Additionally, the hydraulic piston assembly 32 includes a hydraulic pump 38 connected by a traverse valve 36 to the hydraulic cylinder 34. The hydraulic pump 38 is connected to a processing unit 74 to allow computer control of the operation of the hydraulic piston assembly 32.

Figure 7:
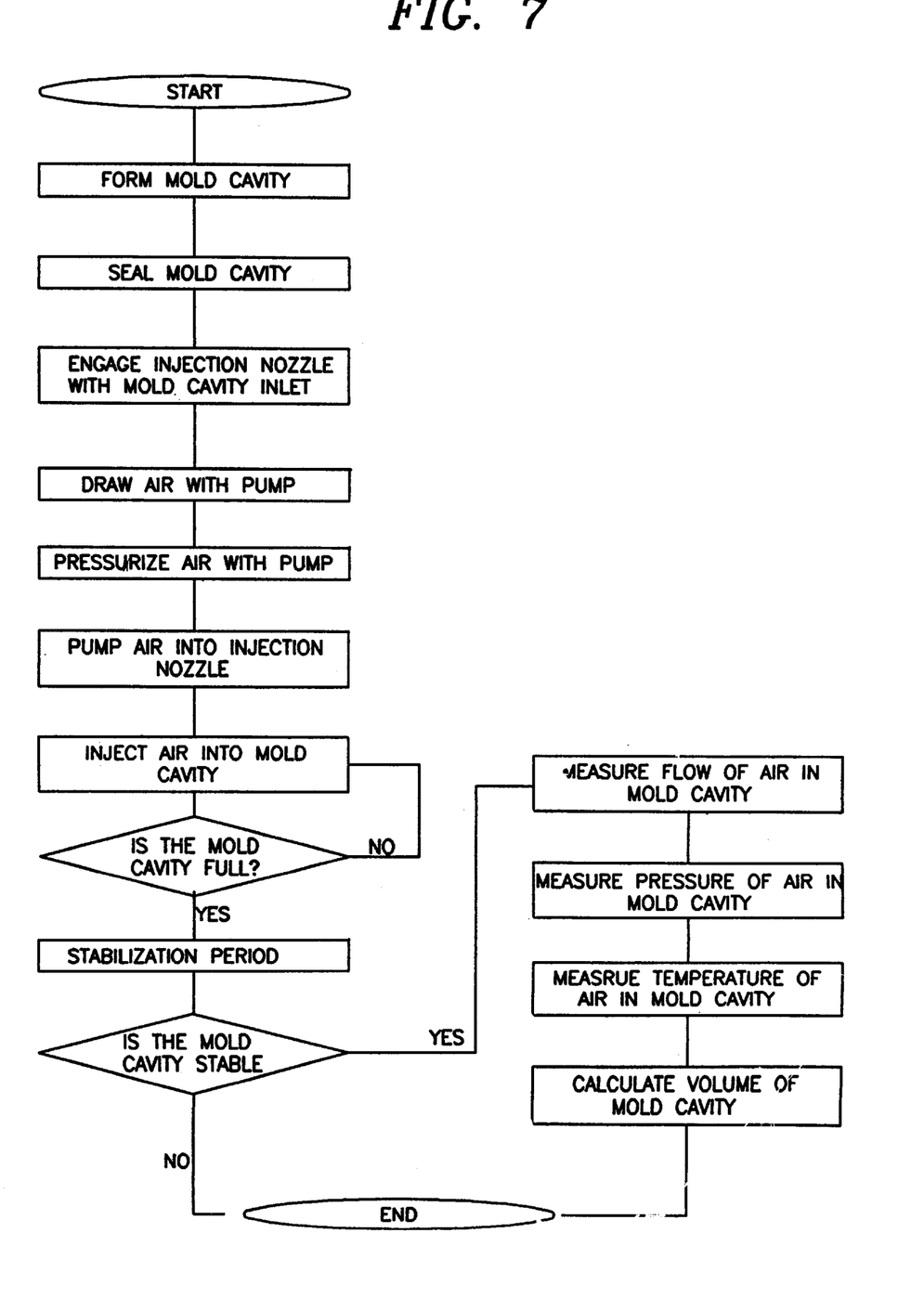
FIG. 7 is a flow chart representation of the computer-readable control program code in accordance with the present invention.

In the preferred embodiment of the invention the processing unit 74 comprises an IBM compatible type personal computer (PC), however, a person of ordinary skill in the art could select any number and type of conventional general purpose computers to implement and perform the methods described herein to which the present invention relates. A computer-readable storage medium (not shown) stores a computer-readable control program code, a representation of which appears in FIG. 7. FIG. 7 does not represent the specific program code, but represents one embodiment of the general control program structure. The computer-readable control program code executing on the processing unit 74 directs at all times the operation of the processing unit 74, and performs the methods described herein to which the present invention relates.

Figure 2:
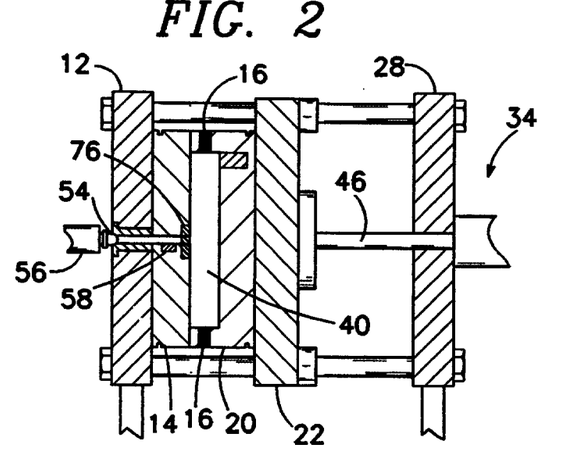
FIG. 2 is the side elevational view of the mold cavity of FIG. 1 in a closed position.

A first mold section 14 is mounted to the first plate 12, and a second mold section 20 is mounted to the mold carriage 22. The first mold section 14 and the second mold section 20 are configured such that, when the hydraulic piston assembly 32 pushes the mold carriage 22 toward the first plate 12, the first mold section 14 and second mold section 20 come into seated alignment forming a mold cavity 40 (shown in FIG. 2). FIG. 1 shows a linear actuator 48 mounted between the first plate 12 and the mold carriage 22 to monitor the distance therebetween. The linear actuator 48, however, could be mounted in any arrangement which would allow accurate monitoring of the position of the first mold section 14 relative to the second mold section 20. The linear actuator 48 also is connected to the processing unit 74. The processing unit 74, by virtue of operative connection to both the hydraulic piston assembly 32 and the linear actuator 48, controls the forming of the mold cavity 40.

Figure 5:
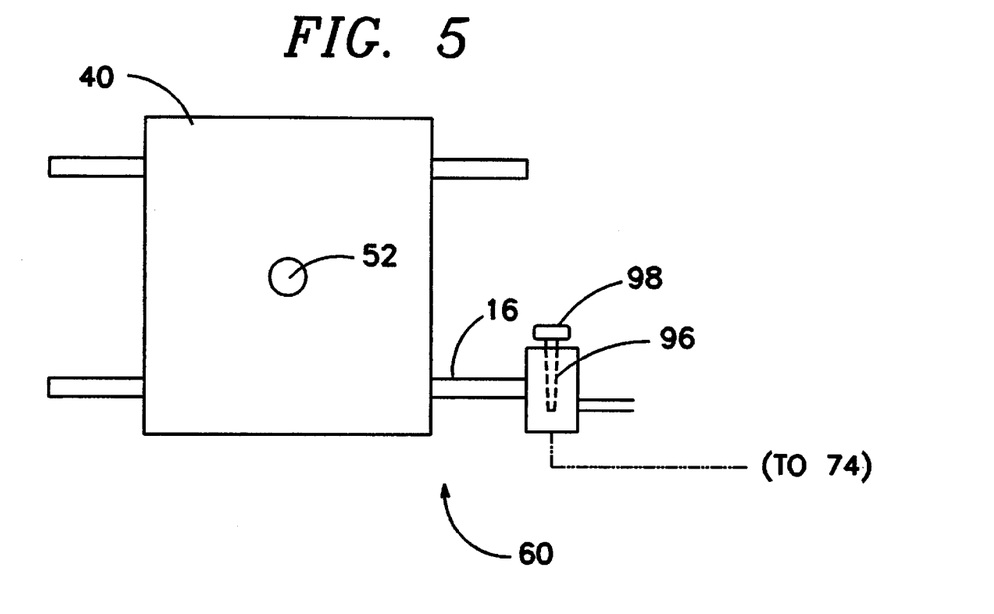
FIG. 5 is a side elevational view of an interior of a mold cavity and a vent valve in accordance with the present invention.

FIG. 5 shows a vent valve 60. The vent valve 60 is affixed to a vent valve throughbore 16 (FIG. 2, FIG. 5) which passes through the second mold section 20. The vent valve 60 itself consists of a needle valve 96 and a solenoid 98, and is operatively connected to the processing unit 74. This type of valve mechanism constitutes a well known structural item to those skilled in the art. The vent valve 60 is configured to move at least between an open and a closed position by manipulation of the needle valve 96 actuated by the solenoid 98. In a preferred embodiment of the invention, the vent valve 60 comprises of a proportional valve capable of opening and closing in conjunction with voltages ranging from zero to ten volts. When closed the vent valve 60 seals the mold cavity 40, and when open the vent valve allows communication with the mold cavity 40. A mold unit 18, of course, can involve any number and arrangement of vent valves 60.

The injection assembly 94 (FIG. 1) includes a hopper 82, through which plastic material 84 enters the injection assembly 94. The hopper 82 rests atop the injection barrel 92. The injection nozzle 56 attaches to the injection barrel 92 on the end closest the mold frame 50. A reciprocating screw 80 is attached in coaxial alignment with the injection barrel 92, on the end of the injection barrel 92 furthest from the mold frame 50. The reciprocating screw 80 turns in place under the control of a large rotational motor 78. A variable volume pressure compensated hydraulic pump 86 is mounted to the injection barrel 92, and operates to move the reciprocating screw 80 along the longitudinal axis of the injection barrel 92. The turning of the reciprocating screw 80 serves to move the plastic material 84 caught in the threads of the reciprocating screw 80 toward the injection nozzle 56. The pressure compensated hydraulic pump 86 moves the reciprocating screw 80 along the longitudinal axis of the injection barrel 92 to form, and de-form, an accumulation zone, near the injection nozzle 56, for the plastic material 84. Together with the processing unit 74, the turning and moving of the reciprocating screw 80 controls the volume, quantity, temperature, and pressure of the plastic material 84 just prior to injection into the mold cavity 40.

A pressure monitor 90 is operatively coupled between the pressure compensated hydraulic pump 86 and the processing unit 74. Additionally, the processing unit 74 is connected to an injection control 88, which in turn is connected to the pressure compensated hydraulic pump 86. A shot size transducer 72 is operably connected between the processing unit 74 and the reciprocating screw 80. The shot size transducer 72 comprises a linear actuator which coordinates the movement of the reciprocating screw 80 along the longitudinal axis of the injection barrel 92 with a predetermined amount of plastic material 84. The processing unit 74 is connected to the large rotational motor 78, enabling the processing unit 74 to control the rotational speed of the reciprocating screw 80. The processing unit 74 operatively connected to the injection assembly in the aforementioned manner, and under the control of computer-readable program code, thus, can control all phases of the plasticizing and injection of the plastic material 84.

FIG. 1 shows an injection means 95 consisting of a pump means 67, a valve means 93, an injection nozzle 56, and a test substance supply line 118. The pump means 67 consists of the test substance reservoir 66, and the rotary pump 68. Rotary pumps of the type contemplated by this invention will become apparent to those skilled in the art. In the preferred embodiment of this invention, the test substance comprises air, however, any number of substances either gas or liquid, of a known density and compressibility, will become apparent to those skilled in the art. In the case where the test substance comprises air, the test substance reservoir 66 would comprise the ambient air. The valve means 93 consists of a gate valve 76, a mold cavity gate 52, and a nozzle inlet 54. The pump means 67 serves to pump the test substance into the injection nozzle 56, while the valve means 93 provides a conduit for engaging the injection nozzle 56 and the mold cavity 40.

The injection nozzle 56 and the nozzle inlet 54 form the point of operative contact between the mold frame 50 and the injection assembly 94. A mold cavity gate 52 extends from the nozzle inlet 54, through the first plate 12, and through the first mold section 14 into the mold cavity 40. At the end of the mold cavity gate 52 opposite of the nozzle inlet 54 lies the gate valve 76. The gate valve is configured to an open and closed position allowing communication between the mold cavity gate 52 and the mold cavity 40. A mold unit 18, of course, can involve any number and arrangement of mold cavity gates 52, and gate valves 76. The processing unit 74 is operatively connected to the gate valve 76, the injection nozzle 56, and the rotary pump 68. The processing unit 74, under the control of computer-readable program code thus, can control the entire injection process.

Figure 3:
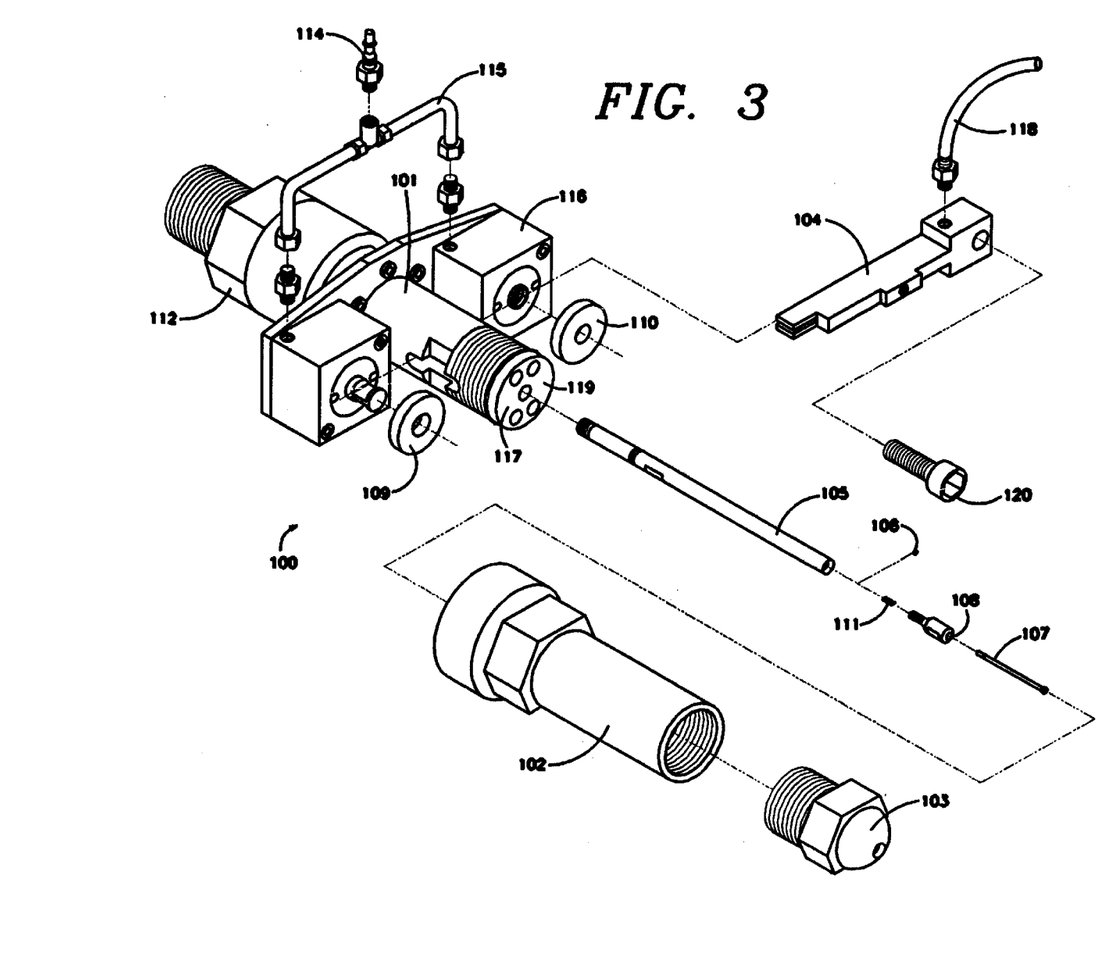
FIG. 3 is an exploded perspective view of an inline injector assembly, in accordance with the present invention.
Figure 4:
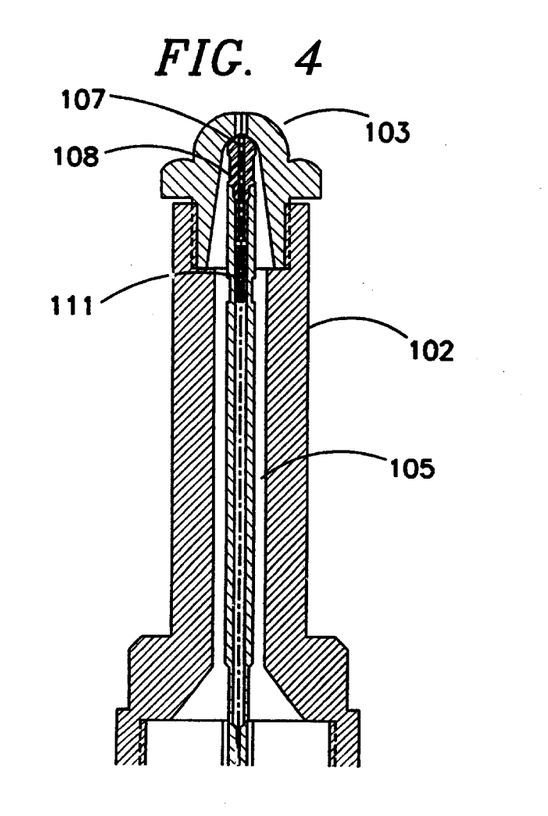
FIG. 4 is a cross-sectioned side elevational view of the inline injector assembly of FIG. 3.

In the preferred embodiment of this invention the injection nozzle 56 comprises an inline injector assembly 100 (FIG. 3). The assembly consists of an end cap adapter 112 which threadably attached to the injection barrel 92. The plastic material 84 flows into the inline injector assembly 100 through the end cap adapter 112. A quick disconnect fitting 114 connects the air line 115 to a pressurized air supply source (not shown). The air lines 115 in turn are affixed to a pair of air cylinders 116, which move back and forth along the longitudinal axis of a shut-off nozzle body 101 which lies between the two air cylinders 116. Configured along the longitudinal axis of the shut-off nozzle 101 lie four injection ports 117, and an inline sleeve ring 119. The plastic material 84 passes through the injection ports 117, leaving the inline sleeve ring 119 free to accept an inline sleeve 105. An inline manifold 104 passes through the shut-off nozzle 101 along a transverse axis of the shut-off nozzle 101. The inline manifold 104 is affixed to the air cylinders 116. A large spacer 109, and a small spacer 110 rest between the inline manifold 104 and the air cylinders 116. A socket head cap screw 120 passes through the inline manifold and the small spacer 110, and is threadably attached to the air cylinder 116, securing the inline manifold 104 in place. The inline sleeve 105 passes through the inline sleeve ring 119 and is threadably attached to the inline manifold 104. Within the inline sleeve 105 lies a retaining ring 106, a compression spring 111, an inline tip 108, and an inline pin 107 (See FIG. 4). The retaining ring 106 holds the compression spring 107 in place within the inline sleeve 105. The inline tip 108 is threadably attached to the inline sleeve 105. The inline pin 107 passes through the inline tip 108 and the compression spring 106, and rests upon the retaining ring 106. Affixed over the outside of the inline sleeve 105 lies a nozzle projection 102, which is threadably attached to the shut-off nozzle 101. A nozzle tip 103 is, in turn, threadably attached to the nozzle projection 102, thereby engaging the inline pin 107. A test substance (not shown) enters the inline manifold 104 from the test substance supply line 118. At this point, the test substance fills the interior of the inline sleeve 105. The test substance applies pressure at the point where the inline pin 107 and the nozzle tip 103 are in contact. The pressure forces the inline pin 107 to compress a compression spring 111 thereby disengaging the inline pin 107 from the nozzle tip 103. In this manner the inline injector assembly injects a test substance into the mold cavity.

FIG. 1 shows a measuring means 63 consisting of a flow meter 64, a pressure transducer 62, and a temperature sensor 58. In the preferred embodiment of this invention the temperature sensor 58 consist of a thermocoupler of a type well know to those skilled in the art. The temperature sensor 58 measures the temperature of the test substance. The test substance, traveling along the test substance supply line 118, passes through the flow meter 64 and the pressure transducer 62 which measure the amount and pressure of the test substance in the test substance supply line 118. Of course, alternative positioning of the components of the measuring means will become apparent to those skilled in the art. The processing unit 74 operatively connected to the pressure transducer 62, the flow meter 64, and the temperature sensor 58. The processing unit 74, under the control of computer-readable program code, thus, can control all phases of measuring the test substance in the mold cavity.

Figure 6:
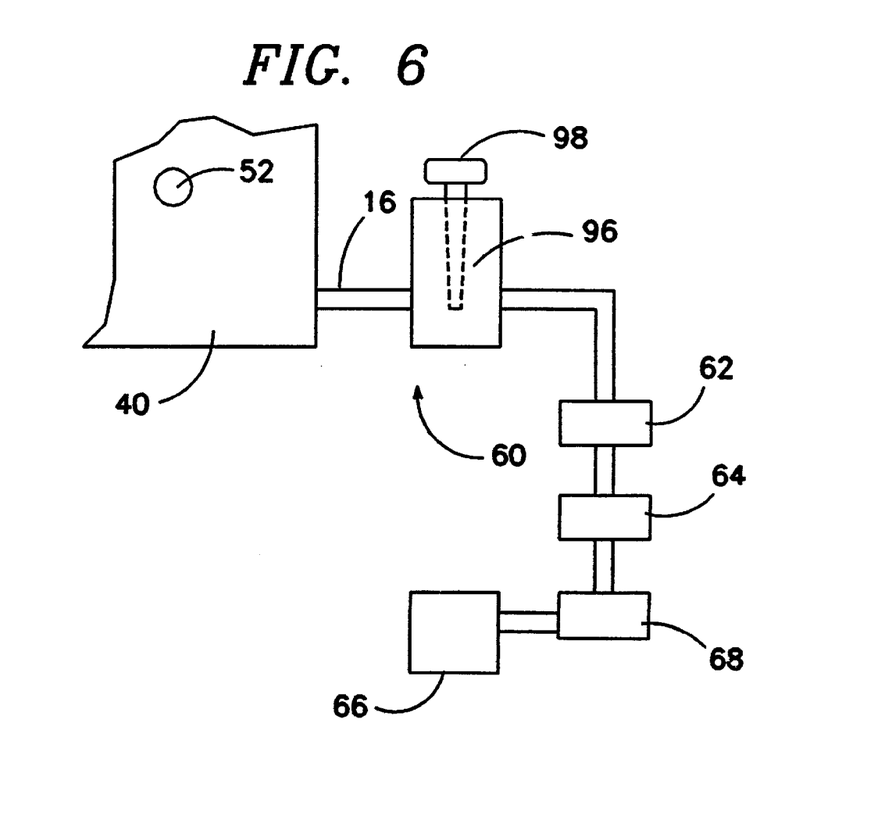
FIG. 6 is a side elevational view of an interior of a mold cavity, and an alternative vent valve, in accordance with the present invention.

FIG. 6 shows an alternative embodiment of the invention where the injection means 95 comprise the vent valve 60 and the valve means 93 comprise the vent valve thoroughbore 16. Accordingly, the test substance reservoir 66, the rotary pump 68, the flow meter 64, and the pressure transducer 62 are operatively connected to the vent valve 60.

The computer controlled process of the present invention is set out in FIG. 7.

The process of determining the precise initial volume of the mold cavity 40 of an injection molding machine 10 begins by forming the mold cavity 40. The piston assembly 32 drives the mold carriage 22, along the support bars 26, toward the first plate 12. The linear actuator 48 monitors the progress of the mold carriage 22 toward the first plate 12. Eventually the mold cavity 40 is formed when the first mold section 14 comes into seated alignment with the second mold section 20.

The next step comprises sealing the mold cavity 40. The vent valves 60 are closed. A voltage signal, zero volts in the preferred embodiment of the invention, sent to the vent valve 60 triggers the solenoid 98 to position the needle valve 96 in a manner which closes communication between the ambient air and the mold cavity.

At this point the injection means 98 begins injecting the test substance. The first step in the injecting process consists of engaging the injection nozzle 56 with the mold cavity inlet 54, thus placing the mold frame 50 and the injection assembly 94 in operative contact. In the preferred embodiment of the invention, upon contact with the mold cavity inlet 54, the injection nozzle 56 engages the valve means 93, thereby allowing communication between the injection nozzle 56 and the mold cavity 40.

Next, the rotary pump 68 begins drawing the test substance from the test substance reservoir 66. Again, in the preferred embodiment the test substance comprises air and the test substance reservoir 66 comprises the ambient air. In other embodiments of the invention, the test substance might comprise a gas, of known compressibility and density, capable of safe use with an injection molding machine 10 and which can safely combine with the ambient air. In still another embodiment of the invention the test substance might comprise a liquid. The liquid must qualify for safe use with an injection molding machine. Examples of a liquid test substance includes water, or solutions commonly used for cleaning the mold cavity. The variety of possible test substances will become obvious to those of ordinary skill in the art.

The rotary pump 68 then pressurizes the test substance in the test substance supply line 118. This creates sufficient pressure to force the test substance through the test substance supply line 118 and into the injection nozzle 56.

At this step, the injection nozzle 56 begins injecting the test substance into the mold cavity 40. In the preferred embodiment of the invention the injection nozzle 56 comprises the inline injection assembly 100 (FIG. 3). The test substance travels under pressure through the test substance supply line 118, into the inline manifold 104, and into the inline sleeve 105. Once the test substance fills the interior of the inline sleeve 105, the pressure of the test substance forces the inline pin 107 to compress the compression spring 106, thereby disengaging the inline pin 107 from the nozzle tip 103. The test substance then flows through the valve means 93 and begins to fill the mold cavity 40.

The next step comprises filling the mold cavity 40 until detection of a predetermined threshold point occurs. In the preferred embodiment of the invention, the injection continues until the pressure transducer 62 detects a certain pressure in the test substance supply line 118, at which point injection stops while still maintaining pressure in the test substance supply line 118. In alternative embodiments, other methods for detecting the predetermined threshold point include monitoring the linear transducer 48 for any change in the gap between the first mold section 14 and the second mold section 20, or by monitoring the pressure of the rotary pump 68, or even by injecting for a predetermined time period. Any number of various methods of detecting the predetermined threshold point will become obvious to those skilled in the art Once the injection cycle completes the filling of the mold cavity 40, a stabilization period begins. The stabilization period ensures the integrity of the mold cavity 40. The step comprises waiting a predetermined period of time while monitoring the threshold level of the test substance. If the threshold level does not remain substantially the same during the stabilization period, the mold cavity 40 lacks integrity, and the process must end since any calculation based on measurements taken while the test substance leaks from the mold cavity 40 will lack sufficient accuracy. The stabilization step highlights the integrity of the mold cavity 40 at three points, first where the injection nozzle 56 contacts the nozzle inlet 54, second where the first mold section 12 contacts the second mold section 20, and lastly at the vent valves 60.

The next step comprises measuring the amount of the test substance in the mold cavity 40. First, the flow of the test substance in the mold cavity 40 is measured. The flow meter 64 monitors the flow of the test substance into the mold cavity 40 over time. For those skilled in the art, calculation of the mass of the test substance flowing through the flow meter 64 involves a matter of routine skill. At this point, the pressure transducer 62 measures the pressure of the test substance in the mold cavity 40. Then the temperature sensor 58 measures the temperature of the test substance in the mold cavity 40.

After measuring the test substance in the mold cavity 40, the vent valves 60 open to allow removal of the test substance. A voltage signal, ten volts in the preferred embodiment of the invention, sent to the vent valve 60 triggers the solenoid 98 to position the needle valve 96 in a manner which opens communication between the ambient air and the mold cavity. Preferably the test substance comprises a gas which can safely enter the ambient air, and does not require any special handling. For this reason, among others, the test substance comprises air in the preferred embodiment of this invention.

The last step involves calculating the precise initial volume of the mold cavity 40. In the preferred embodiment of the invention, the calculation utilizes the formula $V=RMT/P$, where V equals the precise initial volume of mold cavity 40, T equals the temperature of the test substance in the mold cavity 40 obtained from the temperature sensor 58, P equals the pressure of the test substance in the mold cavity obtained from the pressure transducer 62, M equals the mass of the test substance in moles obtained from the flow meter 64, and R equals a constant associated with the test substance. Experimentation shows that R, commonly called the universal gas constant, equals 8.314 joule/mole K for nearly all gases. The above formula, often called the equation of state for an ideal gas, constitutes a well known principle of the kinetic theory of gases.

Of course, the final volume number will require adjustment based on the type of plastic material used, the density of the final product, and subtractions to account for the portion of the test substance flow path not a part of the mold cavity 40. These adjustments, however, comprise matters of routine skill to those of ordinary skill in the art.

In an alternative embodiment of the invention the step of injecting constitutes injecting through the vent valve 60 (FIG. 6). In this embodiment sealing the mold cavity will additionally involve closing the gate valve 76 to prevent flow of the test substance out of the mold cavity 40. The rotary pump 68 will draw the test substance from the test substance reservoir 66, creating sufficient pressure to force the test substance through the test substance supply line 118 and into the vent valve 60. At this point a voltage signal, ten volts in the preferred embodiment of the invention, sent to the vent valve 60 triggers the solenoid 98 to position the needle valve 96 to the open position. The test substance then passes through the vent valve 60 into the vent valve throughbore 16 and begins filling the mold cavity 40. This method avoids some of the hardware required in the preferred embodiment, and simplifies the subtractions required by reducing the test substance flow path. These subtractions could become complicated if for some reason residual plastic material 84 remained inside the valve means 93. This alternative embodiment would eliminate this problem by isolating the test substance flow path from the flow path of the plastic material 84.

In another alternative embodiment of the invention, the test substance comprises a liquid of a known density and compressibility. The vent valves 60 must still be closed to seal the mold cavity 40 in order to prevent the liquid from leaking out of the mold cavity 40. However, filling the mold cavity 40 could forgo the use of a pressurized pump means 67 described in the preferred embodiment of this invention. By simply allowing the air to escape from the top of the mold cavity 40 during the filling of the mold cavity 40, gravity could supply the needed pressure to fill the mold cavity 40 with the liquid test substance. The step of measuring could comprise detecting the predetermined threshold level of the liquid with a fluid level detector 21. After detection of the predetermined threshold level calculating the volume of the mold cavity becomes a matter of routine skill. Methods contemplated include using a flow meter, weighing the liquid, or subtracting the amount used to fill the mold cavity 40 from a known starting amount.

The foregoing description and drawing constitute merely illustrative embodiments of this present invention. The steps of the methods herein described may vary in order based on ability, experience, and preferences of those skilled in the art. Merely listing the steps of the method in a certain order should not constitute any limitation on the order of the steps of the method. The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example the step of measuring the test substance could happen prior to, concurrent with, or after, the step of filling the mold cavity 40.

I claim:

1. A method for determining a precise initial volume of plastic necessary to fill a mold cavity of an injection molding machine, said method comprising the steps of:
   a) providing a first mold section;
   b) providing a second mold section capable of seated alignment with said first mold section thereby forming a mold cavity;
   c) providing a vent valve capable of open and closed communication with said mold cavity;
   d) providing an injection means;
   e) providing a measuring means;
   f) forming a mold cavity by moving said second mold section into seated alignment with said first mold section;
   g) sealing said mold cavity by closing said vent valve;
   h) injecting a test substance of a known density and compressibility through said injection means;
   i) filling said mold cavity with said injected test substance until said measuring means detects a predetermined threshold level;
   j) measuring the amount of said test substance injected into said mold cavity with said measuring means; and
   k) calculating said precise initial volume of plastic necessary to fill said mold cavity based on information from said measuring means.

2. The method of claim 1 comprising:
   a) providing a processing unit operatively connected to said second mold section, said vent valve, said injection means, and said measuring means; and
   b) providing a computer program executable on said processing unit, wherein said processing unit performs said method for determining said precise initial volume of plastic necessary to fill said mold cavity of said injection molding machine.

3. The method of claim 1 comprising the step of stabilizing said test substance in said mold cavity by waiting a predetermined period of time after the detection of said predetermined threshold level to ensure that said predetermined threshold level remains substantially the same.

4. The method of claim 1 comprising the step of removing said test substance from said mold cavity by opening said vent valve after filling said mold cavity with said test substance.

5. The method of claim 1 wherein said injection means comprises:
   a) an injection nozzle for injecting said test substance into said mold cavity;
   b) a valve means for communication between said injection nozzle and said mold cavity; and
   c) a pump means for pumping said test substance into said injection nozzle.

6. The method of claim 5 wherein the step of injecting comprises:
   a) engaging said injection nozzle with said valve means;
   b) pumping said test substance into said injection nozzle with said pump means; and
   c) injecting said test substance into said mold cavity through said injection means.

7. The method of claim 5 wherein said pump means comprises:
   a) a reservoir from which said test substance is drawn; and
   b) a rotary pump for pressurizing said test substance.

8. The method of claim 7 wherein the step of injecting comprises:
   a) drawing said test substance from said reservoir with said rotary pump; and
   b) pressurizing said test substance with said rotary pump.

9. The method of claim 5 wherein said injection nozzle comprises an inline injector assembly.

10. The method of claim 9 wherein the step of injecting comprises injecting said test substance into said mold cavity through said inline injector assembly.

11. The method of claim 5 wherein said valve means comprises a mold cavity gate.

12. The method of claim 11 wherein said step of injecting comprises engaging said injection nozzle with said mold cavity gate.

13. The method of claim 5 wherein said valve means comprises:
   a) a mold cavity inlet for operative contact with said injection nozzle;
   b) a mold cavity gate for operative contact with said mold cavity inlet; and
   c) a gate valve enabling open and closed communication between said mold cavity gate and said mold cavity.

14. The method of claim 13 wherein the step of injecting comprises:
   a) engaging said injection nozzle with said mold cavity inlet, and
   b) opening said gate valve enabling communication between said injection nozzle and said mold cavity.

15. The method of claim 5 comprising providing a gate valve enabling open and closed communication with said mold cavity.

16. The method of claim 15 wherein said step of sealing said mold cavity comprises closing said gate valve.

17. The method of claim 16 wherein said injection nozzle comprise a vent valve.

18. The method of claim 17 wherein the step of injecting comprises injecting said test substance into said mold cavity through said vent valve.

19. The method of claim 16 wherein said valve means comprises a vent valve throughbore.

20. The method of claim 19 wherein said step of injecting comprises engaging said injection nozzle with said vent valve throughbore.

21. The method of claim 1 wherein said test substance comprises a gas of known density and compressibility.

22. The method of claim 21 wherein said test substance comprises air.

23. The method of claim 21 wherein said measuring means comprises:
   a) a flow meter for measuring the mass of said test substance in said mold cavity;
   b) a pressure transducer for measuring the pressure of said test substance in said mold cavity;
   c) a pressure detection means for detecting said predetermined threshold level of said test substance in mold cavity; and
   d) a thermocoupler for measuring the temperature of said test substance in said mold cavity.

24. The method of claim 23 wherein the step of measuring comprises:
   a) measuring said mass of said test substance in said mold cavity with said flow meter;
   b) measuring said pressure of said test substance in said mold cavity with said pressure transducer;
   c) detecting said predetermined threshold level of said test substance in said mold cavity with said pressure detection means; and
   d) measuring said temperature of said test substance in said mold cavity with said thermocoupler.

25. The method of claim 23 wherein said pressure detection means comprises said pressure transducer.

26. The method of claim 25 wherein the step of measuring comprises detecting said predetermined threshold level of said test substance in said mold cavity with said pressure transducer.

27. The method of claim 23 wherein said pressure detection means comprise a linear transducer.

28. The method of claim 24 wherein the step of measuring comprises detecting said predetermined threshold level of said test substance in said mold cavity with said linear transducer.

29. The method of claim 22 wherein the step of calculating comprises utilizing the equation $V=RMT/P$ where V equals said precise initial volume of said mold cavity, T equals the temperature of said test substance in said mold cavity, P equals the pressure of said test substance in said mold cavity, M equals the mass of said test substance in said mold cavity in moles, and R equals a constant associated with said test substance.

30. The method of claim 1 wherein said test substance comprises a liquid of known density and compressibility.

31. The method of claim 30 wherein said measuring means comprises:
   a) a flow meter for measuring the amount of said test substance in said mold cavity, and
   b) a fluid level sensor for detecting said predetermined threshold level of said test substance in said mold cavity.

32. The method of claim 31 wherein the step of measuring comprises:
   a) measuring said amount of said test substance in said mold cavity with said fluid level meter; and
   b) detecting said predetermined threshold level of said test substance in said mold cavity with said fluid level sensor.

33. A method for determining a precise initial volume of plastic necessary to fill a mold cavity of an injection molding machine, said method comprising the steps of:
   a) providing a first mold section;
   b) providing a second mold section capable of seated alignment with said first mold section thereby forming a mold cavity;
   c) providing a vent valve capable of open and closed communication with said mold cavity;
   d) providing an injection means for injecting a gas of known density and compressibility into said mold cavity;
   e) providing a measuring means said measuring means comprising:
      I) a flow meter for measuring the mass of said gas in said mold cavity;
      ii) a pressure transducer for measuring the pressure of said test substance in said mold cavity;
      iii) a pressure transducer for detecting a predetermined threshold level of said gas in said mold cavity; and iv) a thermocoupler for measuring the temperature of said gas in said mold cavity;

f) forming said mold cavity by moving said second mold section into seated alignment with said first mold section;

g) sealing said mold cavity by closing said vent valve;

h) injecting said gas into said mold cavity through said injection means;

i) filling said mold cavity with said gas until said measuring means detects said predetermined threshold level;

j) stabilizing said gas in said mold cavity by waiting a predetermined period of time after the detection of said predetermined threshold level to ensure that said predetermined threshold level remains substantially the same;

k) measuring the amount of said gas injected into said mold cavity with said measuring means said measuring comprising the steps of
  i) measuring said mass of said test substance in said mold cavity with said flow meter;
  ii) measuring said pressure of said test substance in said mold cavity with said pressure transducer;
  iii) detecting said predetermined threshold level of said test substance in said mold cavity with said pressure transducer; and
  iv) measuring said temperature of said test substance in said mold cavity with said thermocoupler;

l) calculating said precise initial volume of plastic necessary to fill said mold cavity based on information from said measuring means.

34. A method for determining a precise initial volume of plastic necessary to fill a mold cavity of an injection molding machine, said method comprising the steps of:

a) providing a first mold section;

b) providing a second mold section capable of seated alignment with said first mold section thereby forming a mold cavity;

c) providing a vent valve capable of open and closed communication with said mold cavity;

d) providing an injection means comprising:
  i) an injection nozzle comprising an inline injector assembly for injecting air into said mold cavity;
  ii) a gate valve means for communication between said injection nozzle and said mold cavity comprising:
    a) a mold cavity inlet for operative contact with said injection nozzle;
    b) a mold cavity gate for operative contact with said mold cavity inlet; and
    c) a gate valve enabling open and closed communication between said mold cavity gate and said mold cavity;
  iii) a pump means for pumping said air into said injection nozzle comprising:
    a) a reservoir for drawing said air from; and
    b) a rotary pump for pressuring said air;

e) providing a measuring means comprising:
  i) a flow meter for measuring the mass of said air in said mold cavity;
  ii) a pressure transducer for measuring the pressure of said air in said mold cavity;
  iii) a pressure transducer for detecting said predetermined threshold level of said air in said mold cavity; and
  iv) a thermocoupler for measuring the temperature of said air in said mold cavity;

f) providing a computer means comprising:
  i) a processing unit operatively connected to said second mold section, said vent valve, said injection means, and said measuring means; and
  ii) providing a computer program executable on said processing unit, wherein said processing unit performs said method for determining said precise initial volume of plastic necessary to fill said mold cavity of said injection molding machine;

g) forming said mold cavity by moving said second mold section into seated alignment with said first mold section;

h) sealing said mold cavity by closing said vent valve;

i) injecting said air into said mold cavity said injecting comprising the steps of:
  i) engaging said inline injection assembly with said mold cavity inlet;
  ii) drawing said air from said reservoir with said rotary pump;
  iii) pressurizing said air in said rotary pump;
  iv) pumping said air into said injection nozzle with said pump means; and
  v) injecting said air into said mold cavity through said inline, injector assembly;

j) filling said mold cavity with said air until said measuring means detects said predetermined threshold level;

k) stabilizing said air in said mold cavity by waiting a predetermined period of time after the detection of said predetermined threshold level to ensure that said predetermined threshold level remains substantially the same;

l) measuring the amount of said air injected into said mold cavity with said measuring means said measuring comprising the steps of:
  i) measuring said mass of said air in said mold cavity with said flow meter;
  ii) measuring said pressure of said air in said mold cavity with said pressure transducer;
  iii) detecting said predetermined threshold level of said air in said mold cavity with said pressure transducer; and
  iv) measuring said temperature of said air in said mold cavity with said thermocoupler;

m) removing said air from said mold cavity by opening said vent valve;

n) calculating said precise initial volume of plastic necessary to fill said mold cavity based on information from said measuring means said calculating comprising the step of:
  i) utilizing the equation V=RMT/P where V equals said precise initial volume of said mold cavity, T equals the temperature of said air in said mold cavity, P equals the pressure of said air in said mold cavity, M equals the mass of said air in said mold cavity in moles, and R equals a constant associated with said air.

35. An injection molding apparatus for determining a precise initial volume of plastic necessary to fill a mold cavity of an injection molding machine comprising:

a) a first mold section;

b) a second mold section capable of seated alignment with said first mold section thereby forming a mold cavity;

c) a vent valve capable of open and closed communication with said mold cavity;

d) an injection means for injecting a test substance into said mold cavity;

e) a measuring means for measuring the amount of said test substance injected into said mold cavity, thereby providing information to calculate the said precise initial volume of plastic necessary to fill said mold cavity; and f) a measuring means for measuring the temperature of said test substance injected into said mold cavity, thereby providing information to calculate the said precise initial volume of plastic necessary to fill said mold cavity.

36. A computer system apparatus for determining a precise initial volume of plastic necessary to fill a mold cavity of an injection molding machine comprising:

a) a general purpose computer; and b) a computer-readable program means, executable on said general purpose computer, comprising;
   i) means for forming a mold cavity by moving said second mold section into seated alignment with said first mold section;
   ii) means for sealing said mold cavity by closing said vent valve;
   iii) means for injecting a test substance of a known density and compressibility through said injection means;
   iv) measuring means;
   v) means for filling said mold cavity with said injected test substance until said measuring means detects a predetermined threshold level;
   vi) means for measuring the amount of said test substance injected into said mold cavity with said measuring means; and
   vii) means for calculating said precise initial volume of plastic necessary to fill said mold cavity based on information from said measuring means.

37. A computer-readable program for determining a precise initial volume of plastic necessary to fill a mold cavity of an injection molding machine comprising:

a) a computer-readable storage medium; and b) a computer-readable program means capable of storage on said computer-readable storage medium, comprising;
   i) means for forming a mold cavity by moving said second mold section into seated alignment with said first mold section;
   ii) means for sealing said mold cavity by closing said vent valve;
   iii) means for injecting a test substance of a known density and compressibility through said injection means;
   iv) means for filling said mold cavity with said injected test substance until said measuring means detects a predetermined threshold level;
   v) means for measuring the amount of said test substance injected into said mold cavity with said measuring means; and
   vi) means for calculating said precise initial volume of plastic necessary to fill said mold cavity based on information from said measuring means.

38. The computer-readable program of claim 37 wherein said computer-readable storage medium comprises a floppy disk.

39. The computer-readable program of claim 37 wherein said computer-readable storage medium comprises a CD-ROM disk.

40. The computer-readable program of claim 37 wherein said computer-readable storage medium comprises a hard disk.

41. A method for determining a precise initial volume of plastic necessary to fill a mold cavity, comprising:

injecting a test substance into the mold cavity;

filling the mold cavity with the test substance until a predetermined threshold point is detected;

monitoring the predetermined threshold point for a predetermined period of time;

calculating the precise initial volume by measuring the amount of test substance in the mold cavity, measuring the pressure of the test substance in the mold cavity and measuring the temperature of the test substance in the mold cavity.

42. The method of claim 41, further comprising ending the method of determining the precise initial volume if the predetermined threshold point does not remain substantially the same during the predetermined period.

43. The method of claim 41, wherein the act of calculating the precise initial volume comprises multiplying the temperature of the test substance in the mold cavity by the amount of test substance in the mold cavity by a universal gas constant, and dividing by the pressure of the test substance in the mold cavity.

44. The method of claim 41 wherein the act of injecting a test substance comprises injecting air.

* * * * *